US011052989B2

(12) United States Patent
Livieratos et al.

(10) Patent No.: US 11,052,989 B2
(45) Date of Patent: Jul. 6, 2021

(54) ACTIVE WING-TWIST MECHANISM AND CONTROL SYSTEM

(71) Applicant: Aurora Flight Sciences Corporation, Manassas, VA (US)

(72) Inventors: Evangelos Livieratos, Manassas, VA (US); Cory Kays, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 598 days.

(21) Appl. No.: 15/701,943

(22) Filed: Sep. 12, 2017

(65) Prior Publication Data
US 2019/0077496 A1 Mar. 14, 2019

(51) Int. Cl.
*B64C 3/52* (2006.01)
*B64C 9/10* (2006.01)
*B64C 39/10* (2006.01)
*G05D 1/08* (2006.01)

(52) U.S. Cl.
CPC ............... *B64C 3/52* (2013.01); *B64C 9/10* (2013.01); *B64C 39/10* (2013.01); *G05D 1/0816* (2013.01); *B64C 2039/105* (2013.01)

(58) Field of Classification Search
CPC .. B64C 3/52; B64C 2039/105; B64C 2039/05
See application file for complete search history.

(56) References Cited

U.S. PATENT DOCUMENTS

| 5,082,207 | A | * | 1/1992 | Tulinius | B64C 3/44 244/76 R |
| 5,681,014 | A | * | 10/1997 | Palmer | B64C 3/52 244/219 |
| 10,279,891 | B2 | * | 5/2019 | Krebs | B64C 3/52 |
| 2008/0149779 | A1 | | 6/2008 | Phillips | |
| 2009/0026321 | A1 | | 1/2009 | Sarh et al. | |
| 2016/0001874 | A1 | | 1/2016 | Pitt et al. | |
| 2019/0202543 | A1 | * | 7/2019 | Gatto | B64C 3/187 |

FOREIGN PATENT DOCUMENTS

EP 2644361 A1 10/2013
WO 20013/061351 A1 5/2013

OTHER PUBLICATIONS

Bowers, Albion H., research slides, titled "On the Minimum Induced Drag of Wings," Aug. 12, 2010.
(Continued)

*Primary Examiner* — Jessica B Wong
(74) *Attorney, Agent, or Firm* — Michael Stanley Tomsa; McAndrews, Held & Malloy, Ltd.; Eugene H. Nahm (57) ABSTRACT

A wing-twist aircraft having a wing, an actuation system, a sensor, and/or a controller. The wing may have a wingspan that extends to a wing tip. The wing may further include a spar aligned in a span-wise direction, wherein at least one rib is operatively coupled to the spar. The actuation system may be configured to torsionally rotate the spar, which, in turn, torsionally rotates (pivots) the at least one rib coupled to the spar, thereby twisting the wing. The sensor may be configured to measure a characteristic of the wing, while the controller may be configured to command the actuation system to torsionally rotate the spar based at least in part on input from the sensor.

23 Claims, 6 Drawing Sheets

(56) References Cited

OTHER PUBLICATIONS

Bowers, Albion H., et al., "On Wings of the Minimum Induced Drag: Spanload Implications for Aircraft and Birds," NASA/TP-2016-219072, Mar. 2016.
Hileman, J. I., et al., "Airframe Design for Silent Fuel-Efficient Aircraft," Journal of Aircraft, vol. 47, No. 3, May-Jun. 2010.
Jardine, A. Peter, et al., "Improved Design and Performance of the SMA Torque Tube for the DARPA Smart Wing Program," Part of the SPIE Conference on Industrial and Commercial Applications of Smart Structures Technologies, Newport Beach, CA, Mar. 1999, SPIE vol. 3674.
Kudva, J. N., et al., "Overview of the DARPA/AFRL/NASA Smart Wing Program," Part of the SPIE Conference on Industrial and Commercial Applications of Smart Structures Technologies, Newport Beach, CA, Mar. 1999, SPIE vol. 3674.
Sargeant, M.A., et al., "Stability of Hybrid-Wing-Body-Type Aircraft with Centerbody Leading-Edge Carving," Journal of Aircraft, vol. 47, No. 3, May-Jun. 2010.
Extended European search report for Application No. 18193804.4, dated Jan. 18, 2019.
Examination report for Application No. EP 18193804.4, dated Jan. 3, 2020.

* cited by examiner

ACTIVE WING-TWIST MECHANISM AND CONTROL SYSTEM

STATEMENT OF GOVERNMENT INTEREST

This invention was made with government support under Contract Number: NNX15CD23P awarded by the National Aeronautics and Space Administration (NASA). The government has certain rights in the invention.

TECHNICAL FIELD

The present disclosure relates to an aircraft having a flexible wing, an active wing-twist mechanism, and control system thereof.

BACKGROUND

In general, static wing tip twist (washout) is used to initiate stall at the wing root, leaving the control surfaces at the outer wing functional. This allows the pilot to recover using the outer wing control surfaces. But a wing setup with static twist to mitigate stall can only be optimized for a narrow flight region. This situation is intensified with blended wing body (BWB) aircraft: to accommodate a payload the center-body airfoils may be thick. Thick airfoils stall at a higher angle of attack than thinner airfoils, assuming both are similar and well suited for the aircraft. This thickness discrepancy leads to the outer wings and the associated control surfaces stalling first. Stalled control surfaces are typically a non-recoverable event for a BWB.

Fixed wing vehicles use coordinated turns to mitigate stall. A coordinated turn with conventional control surfaces will bank the vehicle with aileron input and, in order to mitigate the onset of an accelerated spin, the rudder is used to keep the inside wing from slipping down. However, the presence of a rudder creates constant additional drag area that decreases the aerodynamic efficiency for all operating points. Thus, a need exists for an aircraft, active wing-twist mechanism, and/or control system that can overcome the deficiencies of the prior art.

SUMMARY

The present disclosure relates to an active wing-twist mechanism and control system.

According to a first aspect, an aircraft with active control surface control comprises: a flexible wing defining a wingspan, wherein the flexible wing comprises a spar aligned in a span-wise direction, wherein at least one rib is operatively coupled to the spar such that at least one rib is substantially perpendicular to the spar; an actuation system to torsionally rotate the spar about a twist axis, which, in turn, causes the at least one rib coupled to the spar to rotate about the twist axis, thereby twisting at least a portion of the flexible wing; a sensor configured to measure a characteristic of the flexible wing; and a controller configured to command the actuation system to torsionally rotate the spar based at least in part on input from the sensor.

In certain aspects, the sensor measures at least one of: an aeroelastic characteristic of the flexible wing, a structural characteristic of the flexible wing, an aerodynamic characteristic of the flexible wing, a behavioral characteristic of the flexible wing, or an angle of attack of the flexible wing.

In certain aspects, the controller is configured to command the actuation system to torsionally rotate the spar when the controller identifies, based at least in part on input from the sensor, a risk of stalling.

In certain aspects, the aircraft is a blended wing body (BWB) aircraft.

In certain aspects, the aircraft is an unmanned aircraft.

In certain aspects, the aircraft includes an autopilot to determine at least one of a desired yaw, pitch, or roll of the aircraft.

In certain aspects, the controller is configured to command the actuation system to torsionally rotate the spar when the controller determines, based at least in part on input from the autopilot, that twisting a portion of the flexible wing will assist in achieving at least one of the desired yaw, pitch, or roll.

In certain aspects, the autopilot is configured to actuate a control surface of the aircraft in order to achieve at least one the desired yaw, pitch, or roll.

In certain aspects, the control surface includes at least one of a wing leading edge device, a wing trailing edge device, a wing trailing edge control surface, an elevator, or a rudder.

In certain aspects, the actuation system includes a servo actuator.

In certain aspects, the servo actuator is positioned in a fuselage of the aircraft.

In certain aspects, the servo actuator is positioned in a wing tip.

In certain aspects, the spar comprises a torsion bar.

In certain aspects, the spar comprises a polystyrene spar.

In certain aspects, the flexible wing further comprises a thermoplastic polystyrene skin covering that substantially surrounds the spar and the at least one rib.

In certain aspects, the controller is communicatively coupled with an aerodynamic database containing a collection of control derivatives, wherein the controller is configured to determine the appropriate wing-twist based at least in part on the collection of control derivatives.

In certain aspects, the aerodynamic database is pre-populated using wing-twist simulations.

According to a second aspect, a method of controlling a wing-twist of an aircraft having a flexible wing comprises: sensing a characteristic of the flexible wing; determining an appropriate wing-twist based at least in part on the sensed characteristic of the flexible wing; and torsionally rotating a spar of the flexible wing based at least in part on the appropriate wing-twist determination, wherein the spar is operatively coupled to a rib of the flexible wing, wherein the spar and rib at least partly define a shape of the flexible wing, and wherein the shape of the flexible wing is altered through torsional rotation of the spar.

In certain aspects, the sensed characteristic of the flexible wing includes at least one of: an aeroelastic characteristic of the flexible wing, an aerodynamic characteristic of the flexible wing, a behavioral characteristic of the flexible wing, or an angle of attack of the flexible wing.

In certain aspects, the appropriate wing-twist is determined based at least in part on a risk of stalling.

In certain aspects, the appropriate wing-twist is determined based at least in part on a desired yaw, pitch, or roll of the aircraft.

In certain aspects, the appropriate wing-twist is determined based at least in part on a comparison of the sensed wing characteristic with a collection of control derivatives.

In certain aspects, the collection of control derivatives is maintained in a database.

In certain aspects, the database is pre-populated by wing-twist simulations.

According to a third aspect, a flexible wing comprises: a first spar aligned in a span-wise direction, wherein the first spar extends from a wing root to a wing tip, and wherein the first spar is operatively coupled to a first rib in the wing tip; a second spar aligned in a span-wise direction, wherein the second spar includes a tube operatively coupled to the first spar and a second rib, wherein the first spar is mounted concentrically within the second spar; an outer skin substantially surrounding the first spar, first rib, second spar, and second rib, wherein the outer skin has a shape at least in part defined by the first spar, first rib, second spar, and second rib; and an actuator operatively coupled to a controller and the first spar, wherein the actuator is configured to torsionally rotate the first spar about a twist axis, and wherein torsional rotation of the first spar changes the shape of the outer skin through rotation of the first rib, the second spar, and the second rib.

In certain aspects, the flexible wing further comprises a sensor that measures at least one of: an aeroelastic characteristic of the flexible wing, a structural characteristic of the flexible wing, an aerodynamic characteristic of the flexible wing, a behavioral characteristic of the flexible wing, or an angle of attack of the flexible wing.

In certain aspects, the controller is configured to command the actuator to torsionally rotate the spar when the controller identifies, based at least in part on input from the sensor, a risk of stalling.

In certain aspects, the controller is configured to command the actuator to torsionally rotate the first spar when the controller determines that twisting the flexible wing will assist in achieving at least one of a desired yaw, pitch, or roll.

In certain aspects, the controller is configured to communicate with an aerodynamic database containing a collection of control derivatives generated using wing-twist simulations, wherein the controller is configured to determine the appropriate wing-twist based at least in part on the collection of control derivatives.

In certain aspects, the actuator is a servo actuator.

DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

DETAILED DESCRIPTION

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "about" and "approximately," when used to modify or describe a value (or range of values), mean reasonably close to that value or range of values. Thus, the embodiments described herein are not limited to only the recited values and ranges of values, but rather should include reasonably workable deviations The term "aircraft" refers to a machine capable of flight, including, but not limited to, BWB aircraft, traditional aircraft, unmanned aerial vehicles (UAVs), drones, and vertical take-off and landing (VTOL) aircraft, such as rotorcraft (e.g., helicopters) and/or tilt-rotor/tilt-wing aircraft.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof; and/or (iv) a structural connection, whether attached, affixed, connected, joined, fastened, linked, and/or otherwise secured.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "exemplary" means serving as a non-limiting example, instance, or illustration. As utilized herein, the terms "e.g.," and "for example" set off lists of one or more non-limiting examples, instances, or illustrations.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

Disclosed herein is a system for active wing-twist control. With active wing-twist, the area critical to accelerated stall mitigation, and the area where the control surfaces reside, is actively twisted to increase downwash. Using active wing-twist, an autonomous flight controller may mitigate an accelerated spin by twisting the wing (and/or wing tip) that has an excessive angle of attack. This may avoid the need to pitch the aircraft down. This may be especially relevant when the aircraft is close to the ground. Not only does this allow for active stall mitigation, but it allows autonomous systems to mitigate an accelerated stall without pitching the aircraft below zero alpha.

Active wing-twist may eliminate adverse yaw produced by induced drag and create proverse yaw with induced thrust. If proverse yaw is used, then the rudder and its associated area may be able to be reduced or eliminated; reducing drag and increasing fuel efficiency. Typically a rudder is used to counter adverse yaw, but active wing-twist may produce yaw with lower drag than rudder-induced yaw. Further, it may be possible to use active proverse yaw for stability; reducing or eliminating the need for a vertical stabilizer. Active wing-twist may allow yaw maneuvering without roll, while also allowing turn coordination with lower drag than a rudder coordinated turn.

Active wing-twist may be especially relevant to manned autonomous flight and fully autonomous flight systems. The system may also be ideal for blended wing body (BWB) aircraft, though those of ordinary skill in the art will recognize that the system may be applied to traditional aircraft and others type of aircraft as well. Active wing-twist may reduce the design compromise between cruise and climb, particularly when used with a BWB aircraft. The normal constraints of the BWB layout, which may use a large center body/payload area of the aircraft as a lifting body, may be minimized with the twisted wing control strategy.

The disclosed active wing-twist control system may use a torsionally compliant wing structure integrated with an active twist control architecture to actively control the twist along a wing as commanded during flight operations. The technology may allow for a mitigation of the stall characteristics typically exhibited by BWB aircraft without the need to washout the wingtips at cruise, thereby resulting in a significant increase in aerodynamic efficiency throughout the majority of the flight envelope. Moreover, the ability to tailor the span-wise lift distribution across the wing throughout the flight envelope has the potential to greatly improve aerodynamic performance of aircraft—both conventional and BWB—that have to perform at vastly different points in their flight envelope over a single mission. Furthermore, differential twisting across the wing provides proverse yaw capabilities during a turn, thereby providing a means to perform coordinated turns with smaller or potentially no vertical tail augmentation, which reduces the wetted area (i.e., parasitic drag) of the aircraft. A compliant wing architecture that provides active control of the twist along the span of the wing by sensing and appropriately responding to oncoming stall risks may eliminate the need for outer wing washout and drastically improving the aerodynamic performance of the wing during cruise. The system may further allow significant thickness differences across the wingspan (resulting in payload-carrying capabilities and profile drag reduction) without the risk (and/or with reduced risk) of stall during low-speed operations. Additionally, a compliant internal wing structure can be coupled with an adaptive wing control systems to gain efficiencies in other ways, such as through local gust load alleviation.

Figure 1A:
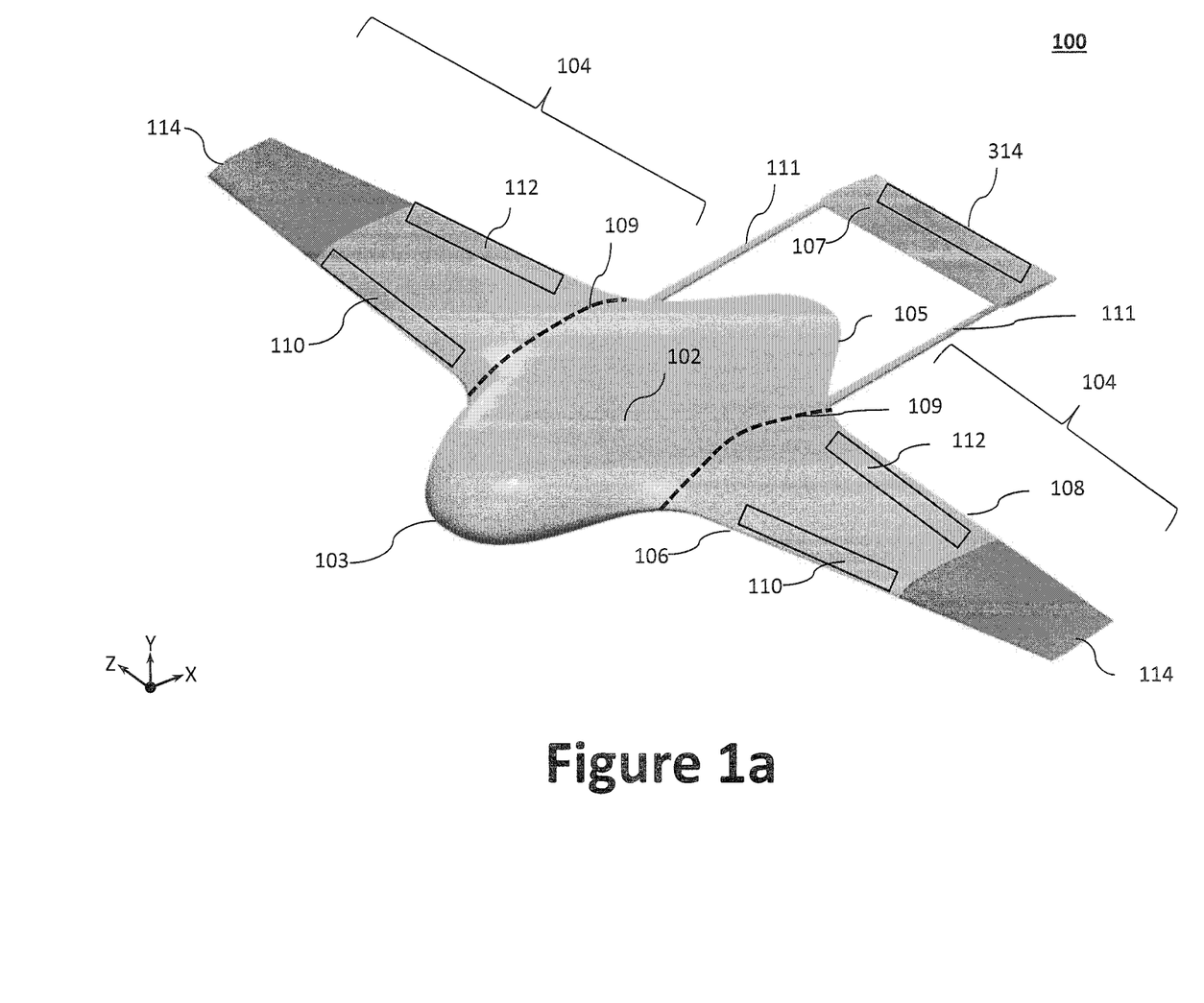
FIG. 1a illustrates an isometric view of a BWB aircraft.

FIG. 1a shows an embodiment of the present disclosure where active wing-twist is used with a BWB aircraft 100. As illustrated, the aircraft 100 may generally comprise a fuselage 102 operatively coupled to a pair of wings 104. The fuselage 102, as illustrated, includes a nose (or forward) portion 103 and a rear (or aft) portion 105. The aircraft may further include a tail (or empennage) 107 operatively coupled to the fuselage 102 at and/or near the aft 105 portion of the fuselage 102. The aircraft 100, may further comprise landing gear. For example, a set of wheels and/or skids may be provided on the fuselage 102 and/or the wings 105. Preferably, at least one wheel or skid is steerable. As illustrated, for example, the tail 107 may include a horizontal stabilizer supported by a pair of parallel tail booms 111.

The wings 104 may have a wingspan extending from a wing root 109 to a wing tip 114. The fuselage 102 and wings 104 may be blended together at and/or near the wing root 109 such that it is difficult to define a specific point at which the fuselage 102 ends and the wing root 109 begins. Each wing 104 may also include a leading edge 106 and a trailing edge 108. Each wing 104 may further include one or more leading edge devices and/or control surfaces 110, such as slats, and/or one or more trailing edge devices and/or control surfaces 112, such as ailerons, flaps, flaperons etc.

Figure 1B:
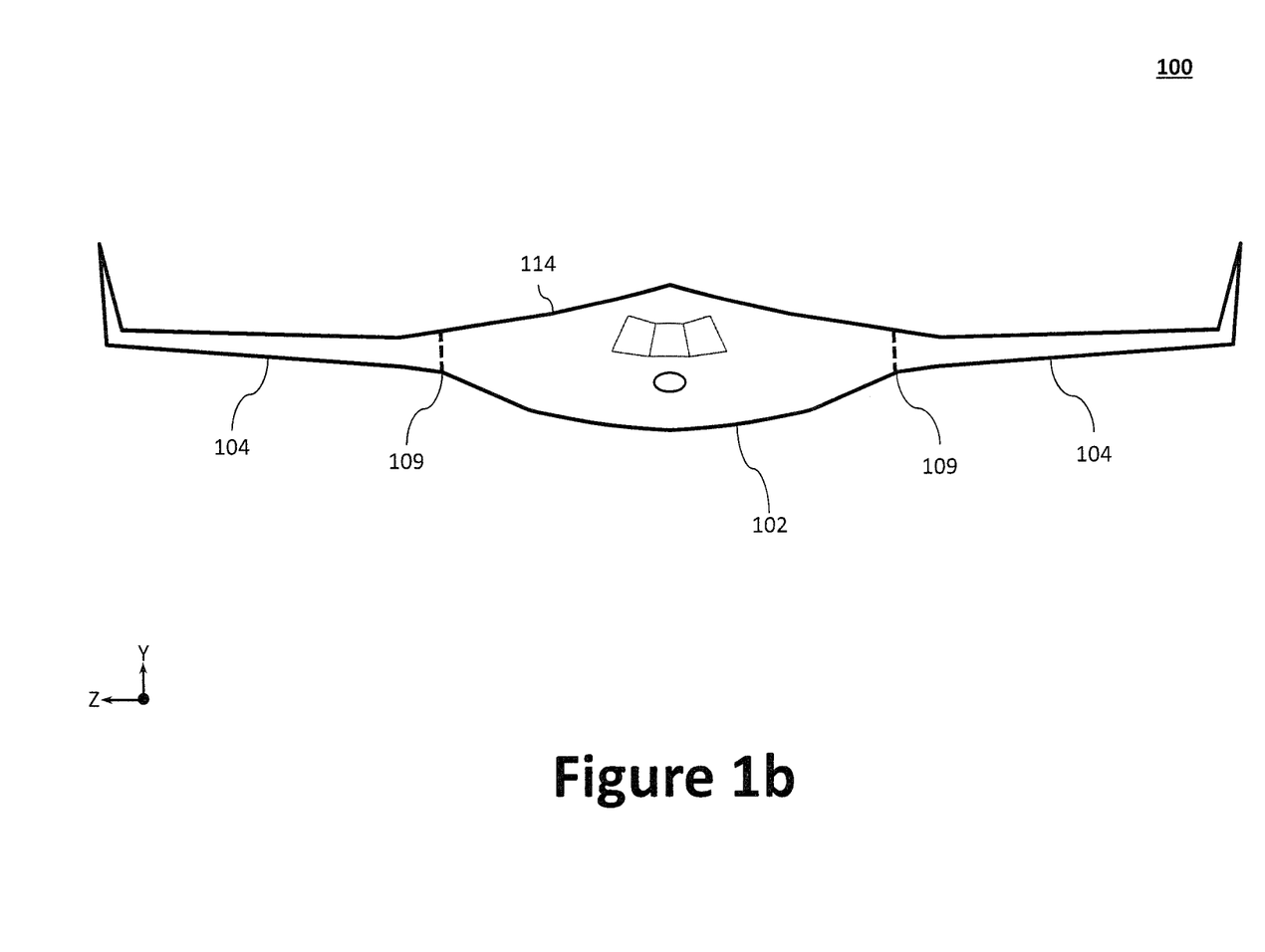
FIG. 1b illustrates a front view of a BWB aircraft

As illustrated in FIG. 1b, the internal components of the aircraft 100 are generally covered (and/or concealed, shielded, etc.) by an external skin (and/or shell) 114, which may be fabricated from a substantially solid aerodynamic material. The various structural components of the aircraft 100 may be fabricated from metal, a composite material, or a combination thereof. For example, the aircraft skin 114 may comprise a thermoplastic polystyrene material. Alternatively, or additionally, the aircraft skin 114 may comprise a metal material, such as, but not limited to, aluminum, titanium, steel, or alloys thereof. Alternatively, or additionally, the aircraft skin 114 may be constructed using composite material such as, but not limited to, fiberglass. As a further alternative, the aircraft skin 114 may be a blend of multiple materials. Some portions of the aircraft skin 114 may be composed of different material than other portions. For example, the wing 104 and/or tail 107 skins 114 may be composed of more flexible material than other portions of the aircraft 100, so as to allow for wing-twisting (and/or morphing, reshaping, etc.). In an exemplary example, the wing skin (e.g., the upper and lower wing skins 114) is substantially flexible and/or compliant such that it does not buckle or tear as the wing twists across the span.

In another example, the aircraft 100, or a component thereof, may be fabricated using fused deposition modeling (FDM), stereolithography (SLA), selective laser sintering (SLS), and/or any other suitable type of additive manufacturing/3D printing. A benefit of this fabrication method is that it produces a high-performing, more stable aircraft, using advanced sensing and 3D printing disciplines. FDM is a thermal polymer layer deposition process that produces parts one layer at a time, effectively printing aircraft components rapidly, in low-volume, and to exacting material specifications. Using FDM, numerous wing design iterations may be inexpensively manufactured to meet desired strength and stiffness requirements, control surface sizing, and other characteristics. Further, additional wings may be fabricated to allow for tailored sensor integration, ease of generating additional actuation schemes or altering the control surface placement, ease of characterizing the strain on the wing, and an ability to easily alter the wing's stiffness to provide the best platform for proprioceptive sensing in a given application. This capability also offers robustness against wing damage, as replacement components are readily reproducible. Additionally, this capability may allow for 3D printing a wing section (e.g. the wingtip) and actively twist the section (possibly with a constant wing washout at the tip)

Figures 2A, 2B:
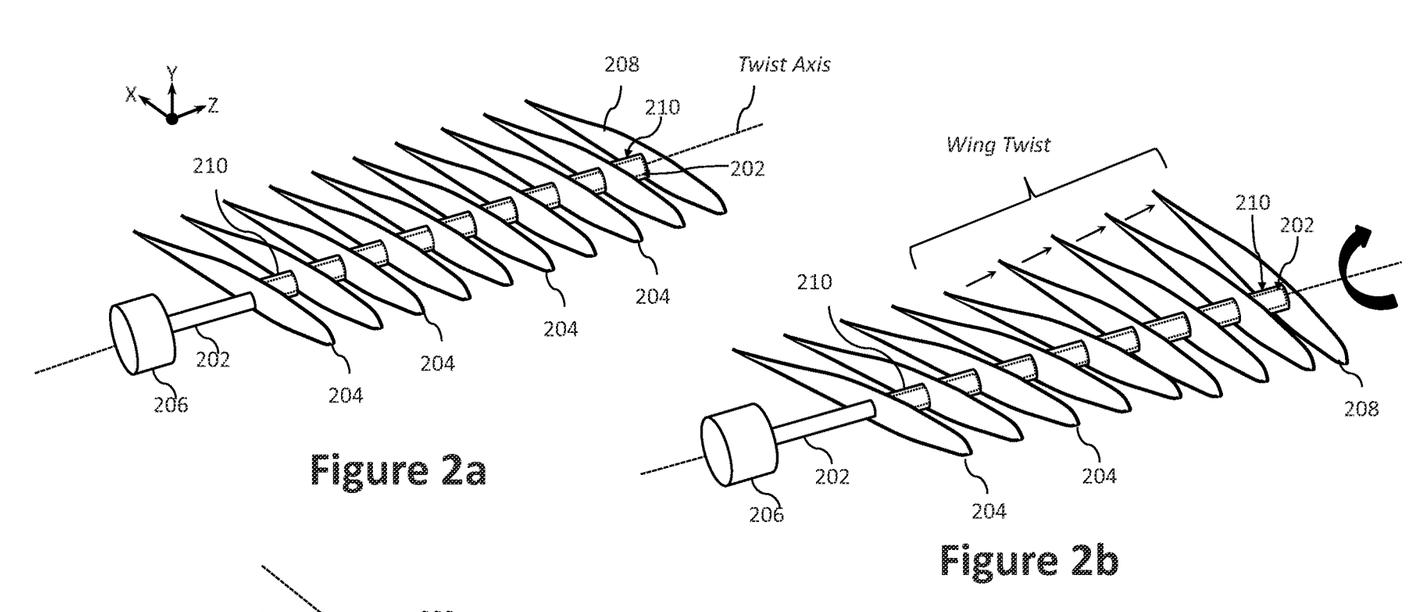
FIG. 2a illustrates an isometric view of internal wing components.
FIGS. 2b and 2c illustrate, respectively, an isometric and a side view of internal wing components during a wing-twist.

As illustrated in FIG. 2a, each wing 104 may include an internal support structure comprising at least one spar 202 operatively coupled to a plurality of ribs 204. At least one of the ribs 204 may be substantially flexible. Alternatively, or additionally, all of the ribs 204 may be flexible. The ribs 204 may have different sizes (and/or shapes, profiles, etc.) depending on their position in the wing 104 and/or the desired size (and/or shape, profile, etc.) of the wing 104 at that position. The spar 202 may be configured to be twisted (and/or rotated, turned, etc.) at one or more points along its length by one or more actuators 206, such as a servo actuator. The actuator 206 may be positioned, for example, in the fuselage 102 of the aircraft 100. Alternatively, or additionally, the actuator 206 may be positioned, for example, in a wing tip 114 of the aircraft 100.

Figure 2C:
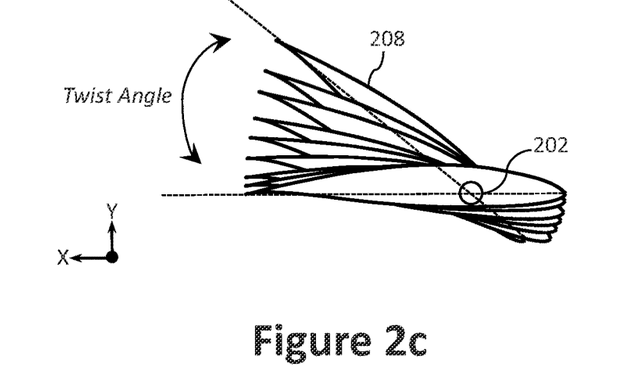

As illustrated in FIGS. 2b and 2c, the ribs 204 may be coupled to the spar 202 and configured to torsionally rotate (e.g., pivot/twist) about the twist axis with the spar 202 (or portion thereof); where the twist axis is generally defined by the length of the spar 202. The degree and location of the twist may be controlled to alter a lift distribution for a given lift coefficient of the wing 104, which could provide aero-structural benefits, such as reduced induced drag and/or tailored load alleviation. In certain aspects, the ribs 204 may be independently controlled and/or configured with different twist angles to achieve a smooth twist distribution along the length of the wing 104. For a given rib 204, as best illustrated in FIG. 2c, the twist angle generally refers to the angle between the chord at the wing root 109 and the chord of the given rib 204. By controlling the twist of the wing 104 using multiple ribs 204 distributed (e.g., evenly distributed) at multiple locations along the length of the spar 202 (and the wing 104), a gradual smooth variation in twist results between the wing root 109 and the final wing tip 114. The smooth twist distribution may allow for easier manufacture because it allows a gradual change across the compliant structure (i.e., the compliant wing skin), which limits the potential for the wing skin to buckle (i.e., warp to produce drag increases). The smooth twist distribution may also alleviate the need to integrate discrete joints and/or other compliant structural features for discontinuous wing twist, which might add weight/complexity to the structure and also increase interference drag due to gaps along the wing from discrete jumps in twist. Thus, there are both manufacturing and aero performance related reasons to use smooth wing twist.

Figure 2D:
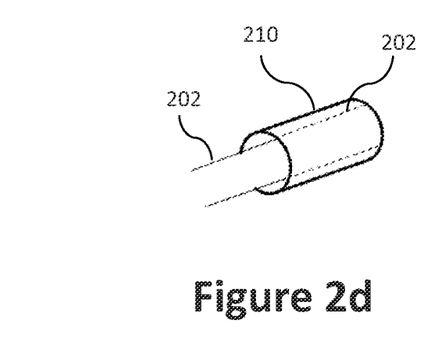
FIG. 2d illustrates an enlarged view of a portion of the internal wing components.

In one embodiment, as illustrated in FIG. 2d, multiple spars may be used. For example, a first spar 202 may be positioned in the fuselage 102 and configured to be twisted by an actuator 206. The first spar 202 may be operatively coupled to a final wing tip 114 rib 208. A second spar 210 may have a first end operatively coupled to the fuselage, and a second end operatively coupled to the first spar 202. The second spar 210 may thus be configured to twist (and/or rotate, revolve, and/or pivot) about the first spar 202. The second spar 210 may be composed of an outer tube (e.g., a composite tube) operatively coupled to a plurality (and/or array) of ribs 204. The ribs 204 may be designed with specific torsional stiffness characteristics to maintain the shape of the airfoil and to twist the upper and lower wing skins 114 when rotated. The second spar 210 may be a tube composite layup conditioned to provide high twist strain. The torsional stiffness may be varied along the length to satisfy the aero requirements (e.g., more twist at the wingtip). The first spar 202 may be mounted concentrically within the second spar 210. The tensional stiffness of the aircraft's outer mold line (OML)—via the upper and lower wing skins 114—may be designed to comply with the twist input of the system.

In an exemplary example, the first spar 202 and the second spar 210 are substantially rigid, so as to provide the necessary bending stiffness to maintain the structural integrity of the wing (although there is torsional compliance between the spars and along the span of the twisting spar). The first spar 202 may be, for example, a torsion bar. The second spar 210 may be composed of, for example, polystyrene. Polystyrene may be used, for example, to achieve maximum stiffness along the wingspan (such as to limit out-of-plane bending, for example). Alternatively, or additionally, the second spar may be a carbon fiber rod. The materials may be composite and/or homogeneous. Alternatively, or additionally, a single spar 202 may be used where different portions of the spar 202 may be composed of different materials. For example, the portion of the spar 202 nearest the fuselage 102 may be different than the portion of the spar 202 nearest the wing tip 114. In some embodiments, the second spar 210 may be contained within a third spar. In some embodiments, the actuator 206 may be positioned in and/or near the wing tip 114. In some embodiments, the actuator 206 may be positioned in and/or near the wing tip 114, and/or be operatively coupled to the wing tip 114 final rib 208 (e.g., the rib at the wing tip). In some embodiments, multiple actuators 206 may be used, with one or more actuators 206 positioned in the fuselage 102, while one or more other actuators 206 are positioned in and/or near the wing tip 114, and/or be operatively coupled to the wing tip 114 final rib 208.

Twisting of the wing spars 202, 210 (and/or spar 202) and associated ribs 204, via actuator 206, may produce twisting (and/or reshaping, morphing, and/or other change in form) of the wing 104. This twisting may alter, change, and/or modify the shape and/or profile of the wing 104. The aircraft 100 may use a control architecture to determine if, when, and/or how to twist the wing 104.

Figure 3:
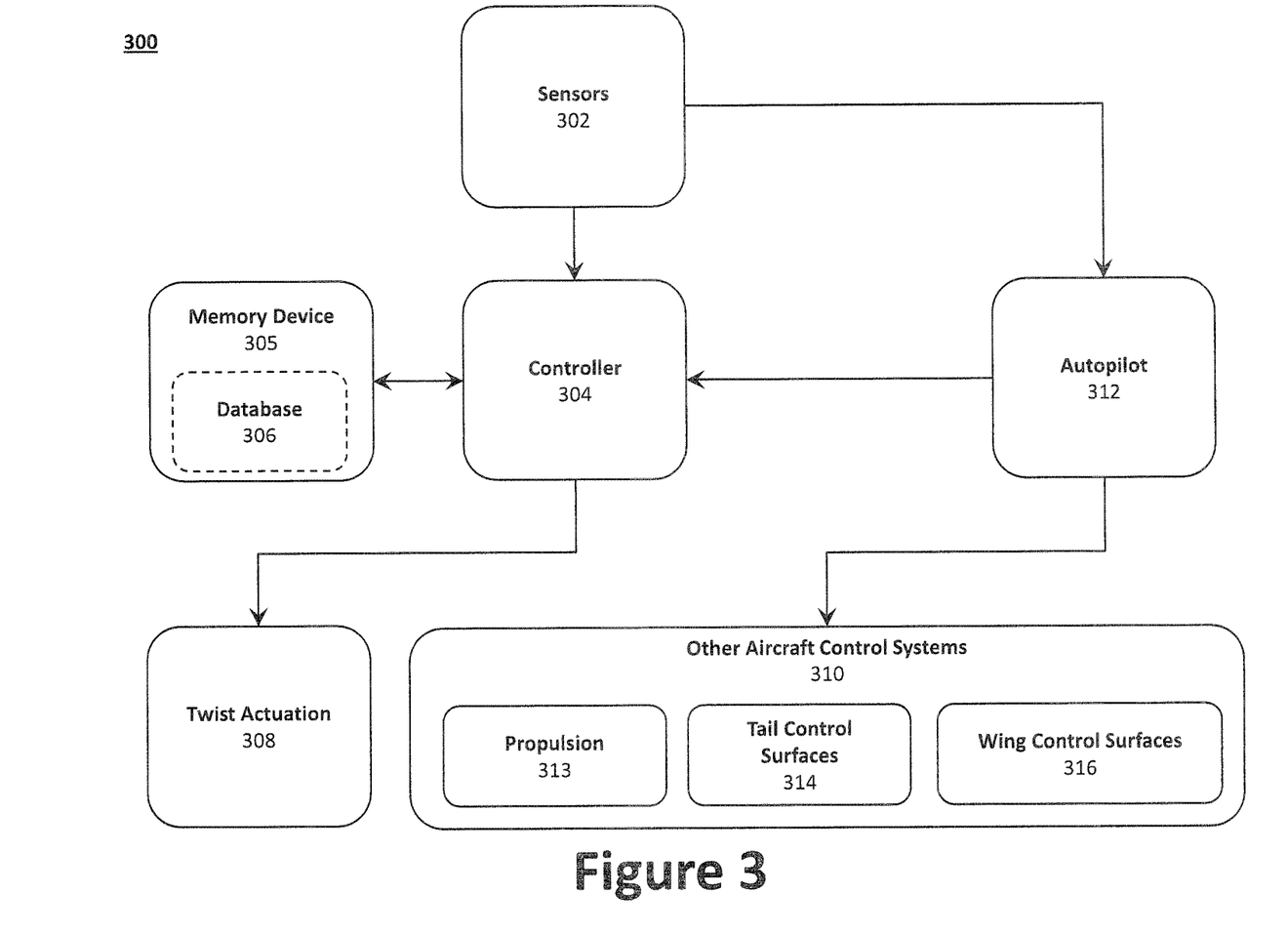
FIG. 3 is a diagram illustrating an active wing-twist control system.

FIG. 3 illustrates a wing-twist control and actuation architecture 300 according to an embodiment of the disclosure. As illustrated, the architecture 300 may include wing-twist sensors 302, a wing-twist controller 304, a memory device 305 (e.g., having a database 306 thereon), a wing-twist actuation system 308, other aircraft control systems 310, and an autopilot 312. The other aircraft control systems 310 may include, for example, a propulsion system 313, the tail 107 and control surfaces 314 associated with the tail 107 (e.g., rudder(s) and/or elevator(s)), as well as control surfaces 316 associated with the wings 104, such as leading edge devices 110 and/or trailing edge devices and/or control surfaces 112.

The aircraft control system may further include other desired services, such as a wireless transceiver coupled with an antenna to communicate data between the aircraft 100 and a remote device (e.g., portable electronic devices, such as smartphones, tablets, and laptop computers) or other controller (e.g., a base station). For example, the aircraft 100 may communicate data (processed data, unprocessed data, etc.) with the remote device over a network. In certain aspects, the wireless transceiver may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device may facilitate monitoring and/or control of the aircraft 100 and its payload(s), including an intelligence, surveillance, and reconnaissance (ISR) payload, which may include one or more sensors, communications packages, weapons systems, instruments, antennas, cameras, radars, or other cargo. The aircraft processor may be communicatively coupled with one or more feedback sensors, including, for example, strain gauges, differential pressure sensors, etc.

Figure 1C:
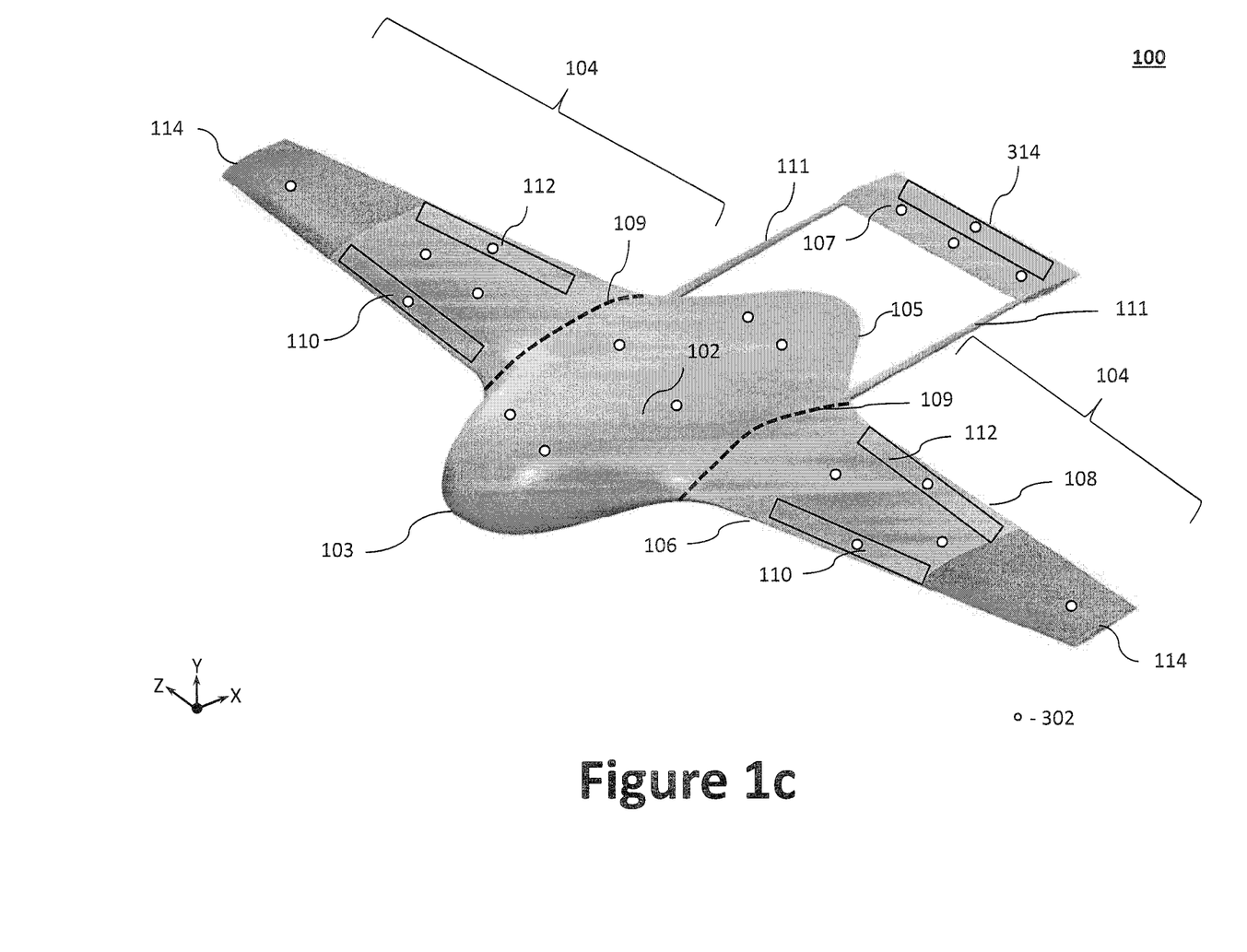
FIG. 1c illustrates an isometric view of a BWB aircraft according to an embodiment of the disclosure.

FIG. 1c illustrates the BWB aircraft 100 having a plurality of sensors 302 therein and/or thereon. The aircraft 100 may use a plurality (and/or series, array etc.) of sensors 302 to determine (and/or detect, sense, and/or otherwise measure) a characteristic of the wing 104, such as, for example, an angle of attack across the wingspan, an aerodynamic characteristic of the wing, a behavioral characteristic of the wing, an aeroelastic characteristic of the wing 104, and/or a structural characteristic of the wing. The sensors 302 may relay this information to an autopilot 312 and/or controller 304 to determine the appropriate wing-twist, and direct twisting of the wing 104 accordingly.

The sensors 302 may be positioned throughout the aircraft 100, both within the aircraft 100 and/or on the exterior skin 114 of the aircraft. The sensors 302 may be positioned on and/or within the fuselage 102, the wings 104, and/or the tail 107 of the aircraft 100. The sensors 302 may be positioned on and/or within the wing 104 leading edge devices 110 and/or trailing edge devices and control surfaces 112. The sensors 302 may be positioned on and/or within the wing tips 114. The sensors 302 may be operatively coupled to a power system of the aircraft 100, and/or powered by an alternative source. The sensors 302 may be connected to one another in distributed network. In some embodiments, some sensors 302 may be networked while other sensors 302 are isolated. In some embodiments, some sensors 302 may be networked and those sensor networks may be isolated from other sensor 302 networks and/or other standalone sensors 302. In some embodiments, all the sensors 302 may be networked together. The sensors 302 may include, for example, inertial measurement units (IMUs), Global Positioning System (GPS) sensors, accelerometers (e.g., ADXL345 accelerometers), gyroscopes (e.g., HMC5883L gyros), magnetometers (e.g., ITG-3200 magnetometers), fluid sensors, strain gauges, differential pressure sensors, etc.

In certain aspects, an array/system of strain gauges and/or pressure sensors may be provided to collect a plurality of strain and/or differential pressure measurements along the span of the wing 104. For example, the wing 104 may utilize a continuous set of sensors (e.g., strain/torque measurement sensors) along the wing to provide feedback to the controller 304. The sensors (e.g., fiber optic strain gauges) may be embedded within micro-grooves or notches (e.g., defined through a 3D printing process). Further, the sensors may be embedded in the top and/or bottom of the wing to obtain numerous torque measurements for use in stabilization. The placement of the grooves may be determined to ensure that the fiber optic sensor yields evenly distributed, span-wise measurements, in addition to measurements for precise locations. The placement of the grooves may be determined by so as to facilitate even distribution of sensor measurements. In addition, an example distributed pressure sensor system is described in greater detail by commonly owned U.S. patent application Ser. No. 62/454,188 to Riley Griffin et al., which was filed on Feb. 3, 2017 and is titled "System and Method for Distributed Airflow Sensing."

Information outputted by the wing-twist sensors 302 may be used as input to the autopilot 312 and/or the controller 304. The controller 304 may employ a processor or microcontroller unit (MCU) implemented using, for example, a BeagleBone or BeagleBoard. The controller 304 may further include one or more driver circuits to facilitate control of the various components thought, for example, a processor. The controller 304 may use information provided by the sensors 302 to recognize and/or determine oncoming stall risks, for example. The controller 304 may further command the actuation system 308 to actively twist the wing 104 in response to the input from the sensors 302 and/or determination of an oncoming stall risk, as well as in response to input from a pilot (and/or navigator) and/or autopilot 312.

The controller 304 and the autopilot 312 may communicate via Micro Air Vehicle Links (MAVlink) protocol over a serial port. The controller 304 and autopilot 312 may additionally, or alternatively, communicate using a universal asynchronous receiver/transmitter (UART). The autopilot 312 may be a Pixhawk, for example. The autopilot 312 may be configured to perform rigid body control and/or determine the necessary and/or desired yaw, pitch, and roll of the aircraft 100. The autopilot 312 may be configured to consider and/or respond to pilot 402 (and/or navigator, operator, etc.) input. For example, the autopilot 312 may take into consideration the input of the pilot 402 when performing rigid body control and/or determining a necessary and/or desired yaw, pitch, and roll of the aircraft 100. The autopilot 312 may be additionally, or alternatively, configured to operate substantially autonomously. The autopilot 312 may also be configured to receive and/or operate on sensor 302 input. In particular, the autopilot 312 may use sensor 302 inputs in conjunction with pilot 402 input and/or autonomous processes to perform rigid body control and/or determine the necessary and/or desired yaw, pitch, and roll of the aircraft 100. Once the determination is made, the autopilot 312 may output a command signal to the other aircraft control systems 310 to maneuver the aircraft 100 accordingly. The autopilot 312 may be tuned using proportional-integral-derivative (PID) gain controllers for flight. The PID controllers may be configured to output desired control surface positions, which may then passed from the autopilot 312 to the wing-twist controller 304 and/or the other aircraft control systems 310.

The controller 304 may also communicate with a memory device 305 having software and/or a database 306 stored thereon. The database 306 may be a relational database, a non-relational database, or some other sort of database. The database 306 may be populated with information helpful to the controller 304, such as a collection of aerodynamic control derivatives related to the aircraft 100. The control derivatives may be generated through the use of simulations and/or tests. For example, the aerodynamic derivatives may be estimated via a combination of wind tunnel and flight testing. The database 306 may be prepopulated with data and/or populated with data during flight. The database 306 may be used to estimate a partial derivative of a non-linear aeroelastic equation to assist the controller 304 in controlling wing-twist.

Figure 4:
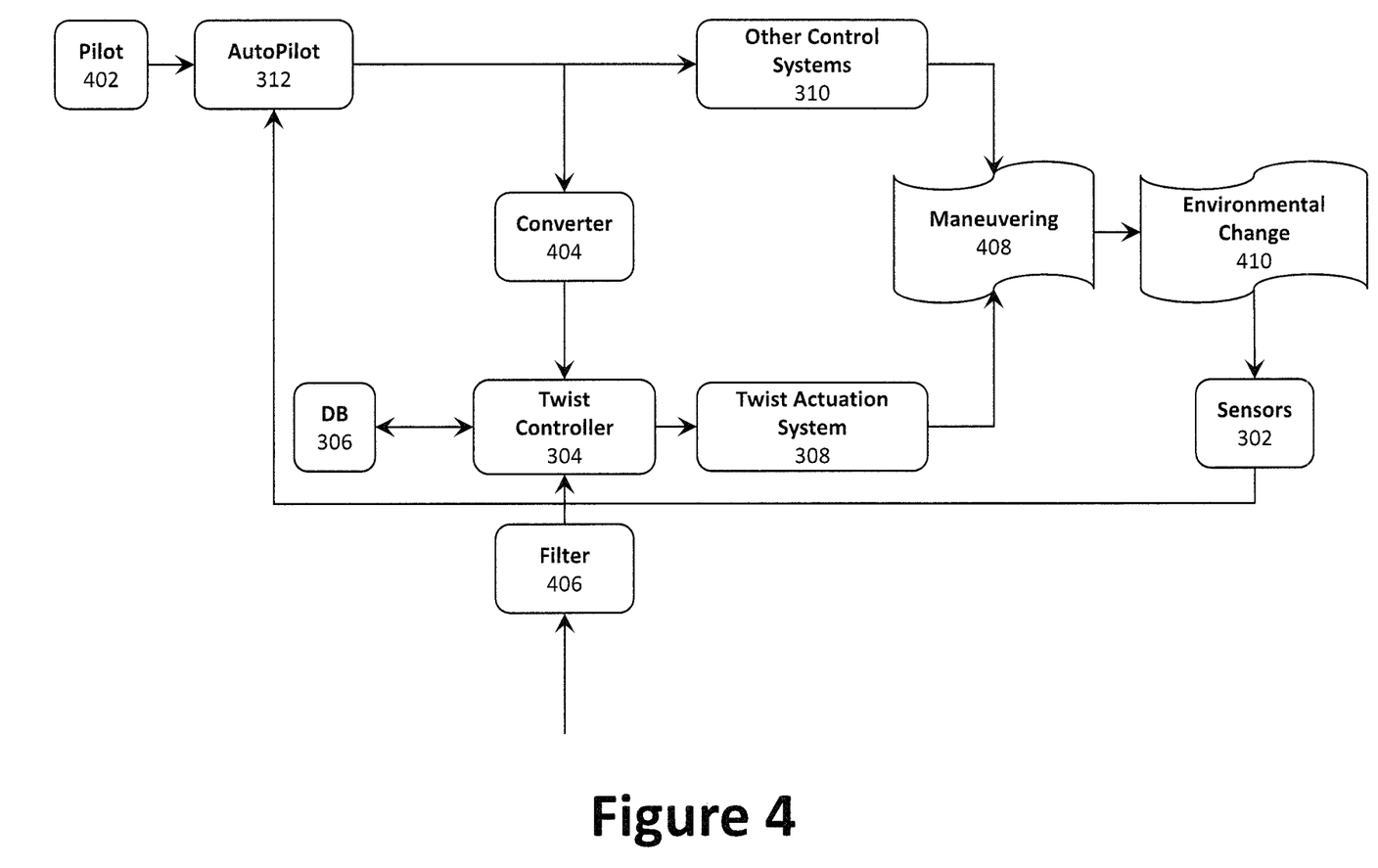
FIG. 4 is a more detailed diagram illustrating the active wing control system

FIG. 4 illustrates the wing-twist control and actuation architecture 300 in more detail, according to an embodiment of the disclosure. As shown in the figure, the autopilot 312 may communicate with the other control systems of the aircraft 100 to maneuver the aircraft 100. In particular, the autopilot 312 may use one or more pulse width modulated (PWM) signals to communicate with the other control systems 310 of the aircraft. The autopilot 312 may also communicate with the controller 304. More particularly, the autopilot 312 may output a PWM command signal to a PWM command converter 404, which may convert the signal into a form readable by the controller 304. The controller 304 may use the autopilot 312 determined rigid body control and/or desired yaw, pitch, and roll of the aircraft 100 as input to its determination of appropriate wing-twist. The controller 304 may further perform analysis, comparisons, and/or interpretation of data in the database 306 in its determination of appropriate wing-twist. Additionally, the controller 304 may use sensor 302 data in its determination. As shown in FIG. 4, the sensor 302 data may be operated on by a filter 406 before being used by the controller 304.

The controller 304 may output one or more control signals to the twist actuation system 308 to affect appropriate wing-twist. This may be performed substantially concurrently with the autopilot 312 command signals to the other control systems 310, such that maneuvering of the aircraft 100 is performed in concert. Maneuvering of the aircraft 100 is performed at 408 in FIG. 4. Subsequent environmental changes in aircraft 100 rigid body dynamics, angle of attack, aerodynamic characteristics, behavioral characteristics, aeroelastic characteristics, structural characteristics, and/or aeroelastic dynamics take place at 410 in FIG. 4. These changes may be sensed by the sensors 302, and fed back in a feedback loop to the autopilot 312 and controller 304 to make further determinations, commands, and/or decisions.

The twist controller 304 may use an aeroelastic model. The model may be defined by the equation below, where M is the beam theory mass matrix for the twisting wing, C is the beam theory damping matrix, K is the beam theory elastic matrix, $M(\alpha, \beta, U_\infty, \theta, \delta)$ is the aerodynamic moment function that is dependent on, α—angle of attack, β—side slip, $U_\infty$—airspeed, θ—tip twist, δ—control surface displacement, $B_{Twist}$ is the input matrix, and U is the torque input:

$$M\ddot{\theta} + C\dot{\theta} + K\theta + M(\alpha, \beta, U_\infty, \theta, \delta) = B_{Twist} U$$

The controller 304 may linearize and combine the model with output and reference matrices to achieve the following system of equations:

$$\tilde{X} = AX + Bu + E$$
$$y = CX$$
$$\theta_{tip} = HX$$

where, $$A = \begin{bmatrix} 0 & I \\ M^{-1}(K + qScC_{m\alpha}) & 0 \end{bmatrix}$$

and q is the dynamic pressure, S is the sectional wing area, c is the sectional cord, and $C_{m\theta}$ is the diagonal matrix containing the local twists pitching coefficient. The torque is being directly applied to the wing, resulting in:

$$B = \begin{bmatrix} 0 \\ M^{-1}\begin{bmatrix} 0 \\ \vdots \\ 1 \end{bmatrix} \end{bmatrix} \text{ and}$$

$$E = \begin{bmatrix} 0 \\ qSc(C_{m\alpha}\alpha I + C_{m\beta}\beta I) + M_{U_\infty}U_\infty I) \end{bmatrix}$$

where $C_{m\alpha}$ is the coefficient of pitch with respect to angle of attack, $C_{m\beta}$ is the coefficient of pitch with respect to sideslip, and $M_{U\infty}$ is the pitching moment with respect to airspeed. C is the linearized conversion from tip twist to acceleration and H is returning tip twist. The A and E matrices may be populated from the aerodynamic database 306.

The controller 304 may use a linear quadratic (LQ) set-point tracking control, where the error between the set-point and the desired tip twists are minimized, the error equation is:

$$e = \theta_{cmd} - \theta_{tip}$$

resulting in $$e = \theta_{cmd} - HX = M\theta_{cmd} - HX$$

where M is the identity matrix. The states may then be augmented with integration of the error.

$$z = [x; x_i]^T$$

The controller 304 may then be developed to minimize the following cost function:

$$I = 1/2 \int_0^\infty (z^T Q z + u^T R u) dt$$

which gives the following gain matrices:

$$K_x = R^{-1} B^T P$$

$$K_{\theta_{cmd}} = R^{-1} B^T (PBR^{-1}B^T - A^T)^{-1}(H^T QM + PG)$$

where P is the solution to the algebraic Ricatti equation and G is the solution to the feedforward gain vector equation. These results may be combined with an additional feedforward gain to counter E, resulting in the following control equation:

$$u = -K_x X - K_{\theta_{cmd}} \theta_{cmd}$$

As noted above, the autopilot 312 may output a PWM command signal to a PWM command converter 404, which may convert the signal into a form readable by the controller 304. The PWM signals may be transmitted using Micro Air Vehicle Link (MAVLink) protocols and/or packages. A software architecture may be used to interpret and communicate the MAVLink transmissions.

As noted above, the controller 304 may use a hybrid Kalman filter 406 to assist in interpretation of sensor 302 information. The Kalman filter 406 may be compiled into a single class for modularity and re-usability of the code base. The hybrid Kalman filter 406 may assume the system model $$\dot{x}(t) = f(x)t), u(t)) + w(t)$$

$$z(t) = Cx(t) + v(t)$$

where w(t) is the model noise, v(t) is sensor noise, x(t) are the twist states, z(t) is the sensor output, and $$f(x(t), u(t)) = \begin{bmatrix} 0 & \dot{\theta} \\ M^{-1}(K + qScM(\alpha, \beta, U_\infty, \theta, \delta)) & 0 \end{bmatrix} + B_{Twist} U$$

The estimation of the state and covariance derivatives may be $$\hat{X} = F(t)X + B_{Twist} U$$

$$\dot{P}(t) = F(t)P(t) + P(t)F(t)^T + Q(t)$$

where $$F(t) = \left.\frac{\partial f(x)}{\partial x}\right|_{\hat{x}}$$

which is estimated by the interpolation of the aero database. Estimates of $X_{k|k-1}$ and $P_{k|k-1}$ may be taken from integration of estimated derivatives above. This integration may be done by a fourth order Runge-Kutta method, the results of which are used to create the Kalman gain $$K_k = P_{k|k-1} H_k^T (H_k P_{k|k-1} H_k^T + R_k)^{-1}$$

This Kalman gain may then be used to create an estimate of the state and covariance matrix.

$$\hat{X}_{k|k} = \hat{X}_{k|k-1} + K_k(z_k - C\hat{X}_{k|k-1})$$

$$P_{k|k} = (1 - K_k C) P_{k|k-1}$$

In operation, the sensors 302 may detect (and/or sense, measure, etc.) rigid body dynamics, angle of attack, aerodynamic characteristics, behavioral characteristics, aeroelastic characteristics, structural characteristics, and/or aeroelastic dynamics of the aircraft 100 (and/or the wings 104 of the aircraft). The sensors 302 may relay this information to the controller 304 and/or the autopilot 312. The autopilot 312 may use this information along with input from the pilot 402 and/or its own autonomous systems to determine the necessary and/or desired yaw, pitch, and roll of the aircraft 100. Once the determination is made, the autopilot 312 may output a command signal to the other aircraft control systems 310 to maneuver the aircraft 100 accordingly. The autopilot 312 may additionally output the signal, and/or some other signal to the controller 304. The controller 304 may receive the signal from the autopilot 312 as input (potentially after some conversion, modification, interpretation, and/or other processes) and use the information to determine the appropriate wing-twist. The controller 304 may then output a control signal to the wing-twist actuation system 308, which may twist the wing 104 via the spar 202 (and/or spars 202, 210) and associated ribs 204. The twisting of the wing 104 in conjunction with the use of the other control systems 310 of the aircraft 100 may maneuver the aircraft 100 during flight.

Using the active wing-twist strategy, an autonomous flight controller can mitigate an accelerated spin by twisting a wing 104 and/or wing tip 114 that has an excessive angle of attack. This may avoid the need to pitch the aircraft down. This may be especially relevant when the aircraft is close to the ground. This control strategy may also reduce a design compromise between cruise and climb, particularly when used with a BWB aircraft. The normal constraints of the BWB layout, which use the large center body/payload area of the aircraft as a lifting body, are minimized with the twisted wing control strategy. Further, this control strategy may produce yaw with lower drag than rudder-induced yaw. This may allow yaw maneuvering without roll, as well as coordinated turns with lower drag than a rudder coordinated turn. If proverse yaw is used then the rudder and its associated wetted area can be eliminated, reducing drag and increasing fuel efficiency. Further, it would be possible to use active proverse yaw for stability; eliminating and/or substantially reducing the need for a vertical stabilizer.

While the disclosure above is described primarily with respect to BWB aircraft, persons of ordinary skill in the art will understand that it may be applied to other types of aircraft as well, including, but not limited to traditional aircraft, unmanned aerial vehicles (UAVs), drones, and vertical take-off and landing (VTOL) aircraft.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An aircraft, comprising:
   a flexible wing defining a wingspan between a wing root and a wing tip, wherein the flexible wing comprises:
      a first spar aligned in a span-wise direction between the wing root and the wing tip, wherein at least a first rib is coupled to the first spar at the wing tip such that the first rib is substantially perpendicular to the first spar; and
      a second spar aligned in the span-wise direction between the wing root and the wing tip and coupled at one end to the first rib, wherein a plurality of ribs is coupled to the second spar, and wherein the first spar is mounted concentrically within the second spar;
   an actuation system to torsionally rotate the first spar about a twist axis, which, in turn, causes at least the first rib coupled to the first spar to rotate about the twist axis, wherein torsional rotation of the first spar changes a shape of the flexible wing through rotation of the first rib, the second spar, and the plurality of ribs;
   a sensor configured to measure a characteristic of the flexible wing; and
   a controller configured to command the actuation system to torsionally rotate the first spar based at least in part on input from the sensor.

2. The aircraft of claim 1, wherein the sensor measures at least one of: an aeroelastic characteristic of the flexible wing, a structural characteristic of the flexible wing, an aerodynamic characteristic of the flexible wing, a behavioral characteristic of the flexible wing, or an angle of attack of the flexible wing.

3. The aircraft of claim 1, wherein the controller is configured to command the actuation system to torsionally rotate the first spar when the controller identifies, based at least in part on input from the sensor, a risk of stalling.

4. The aircraft of claim 1, wherein the aircraft is a blended wing body (BWB) aircraft.

5. The aircraft of claim 1, wherein the aircraft includes an autopilot to determine at least one of a desired yaw, pitch, or roll of the aircraft, wherein the controller is configured to command the actuation system to torsionally rotate the first spar when the controller determines that, based at least in part on an input from the autopilot, twisting a portion of the flexible wing will assist in achieving at least one of the desired yaw, pitch, or roll.

6. The aircraft of claim 1, wherein the aircraft includes an autopilot to determine at least one of a desired yaw, pitch, or roll of the aircraft, wherein the autopilot is configured to actuate a control surface of the aircraft in order to achieve at least one the desired yaw, pitch, or roll.

7. The aircraft of claim 6, wherein the control surface includes at least one of a wing leading edge device, a wing trailing edge device, a wing trailing edge control surface, an elevator, or a rudder.

8. The aircraft of claim 1, wherein the actuation system includes a servo actuator positioned in a fuselage of the aircraft.

9. The aircraft of claim 1, wherein the first spar comprises a torsion bar.

10. The aircraft of claim 1, wherein the flexible wing further comprises a thermoplastic polystyrene skin covering that substantially surrounds the first spar, first rib, the second spar, and the plurality of ribs.

11. The aircraft of claim 1, wherein the controller is communicatively coupled with an aerodynamic database containing a collection of control derivatives, wherein the controller is configured to determine an appropriate wing-twist based at least in part on the collection of control derivatives.

12. The aircraft of claim 11, wherein the aerodynamic database is pre-populated using wing-twist simulations.

13. A method of controlling a wing-twist of an aircraft having a flexible wing defining a wingspan between a wing root and a wing tip, the method comprising:
   sensing a characteristic of the flexible wing;
   determining an appropriate wing-twist based at least in part on the sensed characteristic of the flexible wing; and
   torsionally rotating a first spar of the flexible wing based at least in part on the appropriate wing-twist determination, wherein the first spar is aligned in a span-wise direction between the wing root and the wing tip and coupled to at least a first rib positioned at the wing tip of the flexible wing, and wherein the first spar is concentrically mounted within a second spar that is aligned in the span-wise direction between the wing root and the wing tip and coupled at one end to the first rib, wherein a plurality of additional ribs are coupled to the second spar;
   wherein the first spar, the first rib, the second spar, and the plurality of ribs at least partly define a shape of the flexible wing, and wherein torsional rotation of the first spar changes the shape of the flexible wing through rotation of the first rib, the second spar, and the plurality of ribs.

14. The method of claim 13, wherein the sensed characteristic of the flexible wing includes at least one of: an aeroelastic characteristic of the flexible wing, an aerodynamic characteristic of the flexible wing, a behavioral characteristic of the flexible wing, or an angle of attack of the flexible wing.

15. The method of claim 13, wherein the appropriate wing-twist is determined based at least in part on a desired yaw, pitch, or roll of the aircraft.

16. The method of claim 13, wherein the appropriate wing-twist is determined based at least in part on a comparison of the sensed wing characteristic with a collection of control derivatives.

17. The method of claim 16, wherein the collection of control derivatives is maintained in a database that is pre-populated by wing-twist simulations.

18. The aircraft of claim 1, wherein each the plurality of ribs is fixed substantially perpendicularly to the second spar.

19. The aircraft of claim 1, wherein a torsional stiffness of the second spar is varied in the span-wise direction along the wingspan.

20. The aircraft of claim 19, wherein the torsional stiffness is decreased in the span-wise direction from the wing root to the wing tip.

21. The aircraft of claim 1, wherein the controller is configured to command the actuation system to torsionally rotate the first spar using an aeroelastic model defined by the equation $M\ddot{\theta}+C\dot{\theta}+K\theta+M(\alpha,\beta,U_\infty,\theta,\delta)=B_{Twist}U$, wherein $B_{Twist}$ is an input matrix, U is a torque input, M is a beam theory mass matrix for the flexible wing, C is a beam theory damping matrix, K is a beam theory elastic matrix, and $(\alpha, \beta, U_\infty, \theta, \delta)$ is an aerodynamic moment function that is dependent on angle of attack ($\alpha$), side slip ($\beta$), airspeed ($U_\infty$), tip twist ($\theta$), and control surface displacement ($\delta$).

22. An aircraft, comprising:

a flexible wing defining a wingspan between a wing root and a wing tip, wherein the flexible wing comprises:

a first spar aligned in a span-wise direction between the wing root and the wing tip, wherein at least a first rib is coupled to the first spar at the wing tip such that the first rib is substantially perpendicular to the first spar, wherein the first spar comprises a torsion bar; and a second spar aligned in the span-wise direction between the wing root and the wing tip and coupled at one end to the first rib, wherein a plurality of ribs is coupled to the second spar, and wherein the first spar is mounted concentrically within the second spar;

an actuation system to change a shape of the flexible wing, wherein the actuation system is configured to rotate the first spar about a twist axis from the wing root, which, in turn, causes at least the first rib coupled to the first spar to rotate about the twist axis at the wing tip, which, in turn, causes the second spar to rotate about the twist axis from the wing tip;

a sensor configured to measure a characteristic of the flexible wing; and a controller configured to command the actuation system to rotate the first spar based at least in part on input from the sensor.

23. The aircraft of claim 22, wherein the actuation system includes a servo actuator positioned in a fuselage of the aircraft.

* * * * *